Dec. 28, 1948.  J. P. TONER  2,457,330

ELECTRIC ANTIHUNT SERVO SYSTEM

Original Filed Nov. 27, 1945  2 Sheets-Sheet 1

FIG.I.

INVENTOR.
JOHN P. TONER
BY
Campbell, Brumbaugh & Fra
HIS ATTORNEYS.

Patented Dec. 28, 1948

2,457,330

UNITED STATES PATENT OFFICE 2,457,330

ELECTRIC ANTIHUNT SERVO SYSTEM

John P. Toner, Woodhaven, N. Y., assignor to Arma Corporation, Brooklyn, N. Y., a corporation of New York Continuation of application Serial No. 631,078, November 27, 1945. This application October 31, 1947, Serial No. 783,301

24 Claims. (Cl. 318—30)

1

This invention relates to servo systems, and has particular reference to systems in which a low power variable is automatically reproduced dynamically as a high power motion with a minimum of error and without hunting or other unwanted oscillations.

This application is a continuation of my copending application Serial No. 631,078, filed November 27, 1945, for Electric anti-hunt servo system, now forfeited.

In modern electronic servo-control systems, the remote control is supplied by the well known method of self-synchronous transmission which produces a rotating magnetic signal in a receiver known as "control transformer." A "null" rotor coil is kept balanced in this field in non-inductive angular position by the response from the servo motor, any voltage that may be induced in the rotor of the control transformer, due to error in reproduction, being amplified electronically and used to drive the servo motor. Such a system is, of course, subject to oscillation and therefore damping has been supplied by feeding the output voltage from a linear generator driven by the servo-motor and against the signal error voltage from the control transformer, whereby the phase relations of the system are changed and oscillation is accordingly prevented. However, such phase damping results in a lag in response of the servo-motor, which is then compensated by adding the output voltage of a second linear generator, likewise driven by the servo-motor, but through a spring and flywheel filter unit, so that it acts only when changes in speed of response error occur. One form of such servo-control system is disclosed in co-pending application Serial No. 626,406, filed November 2, 1945, by F. W. Cunningham, now Patent No. 2,444,813, issued July 6, 1948.

In accordance with the present invention, an improvement in the above-described servo-system is provided, which resides principally in the replacement of the two generators and filter unit by a single generator assembly serving the same purpose in a simple, novel and effective manner. The new system comprises the major elements of the above-described servo-system, but the servomotor drives the stator portion of the substitute generator which has a free low-inertia rotor coupled to the stator through a suitable low-pass mechanical filter assembly, the rotor having no brushes to restrict its response. The voltage generated by the generator is fed into the servomotor driving a dynamic error circuit in opposition to the error voltage to thereby damp the oscillation tendency of the response.

It will be seen that a system of this invention will have no effect on the circuits so long as there is uniform speed of the servo-motor, and that ideal damping effects will be applied to the system

2 immediately upon a variation in speed. In this way the separate damping arrangement of other systems are eliminated and compactness, lightness and simplicity result.

For a more complete understanding of the invention, reference may be had to the accompanying drawings, in which.

Figure 1:
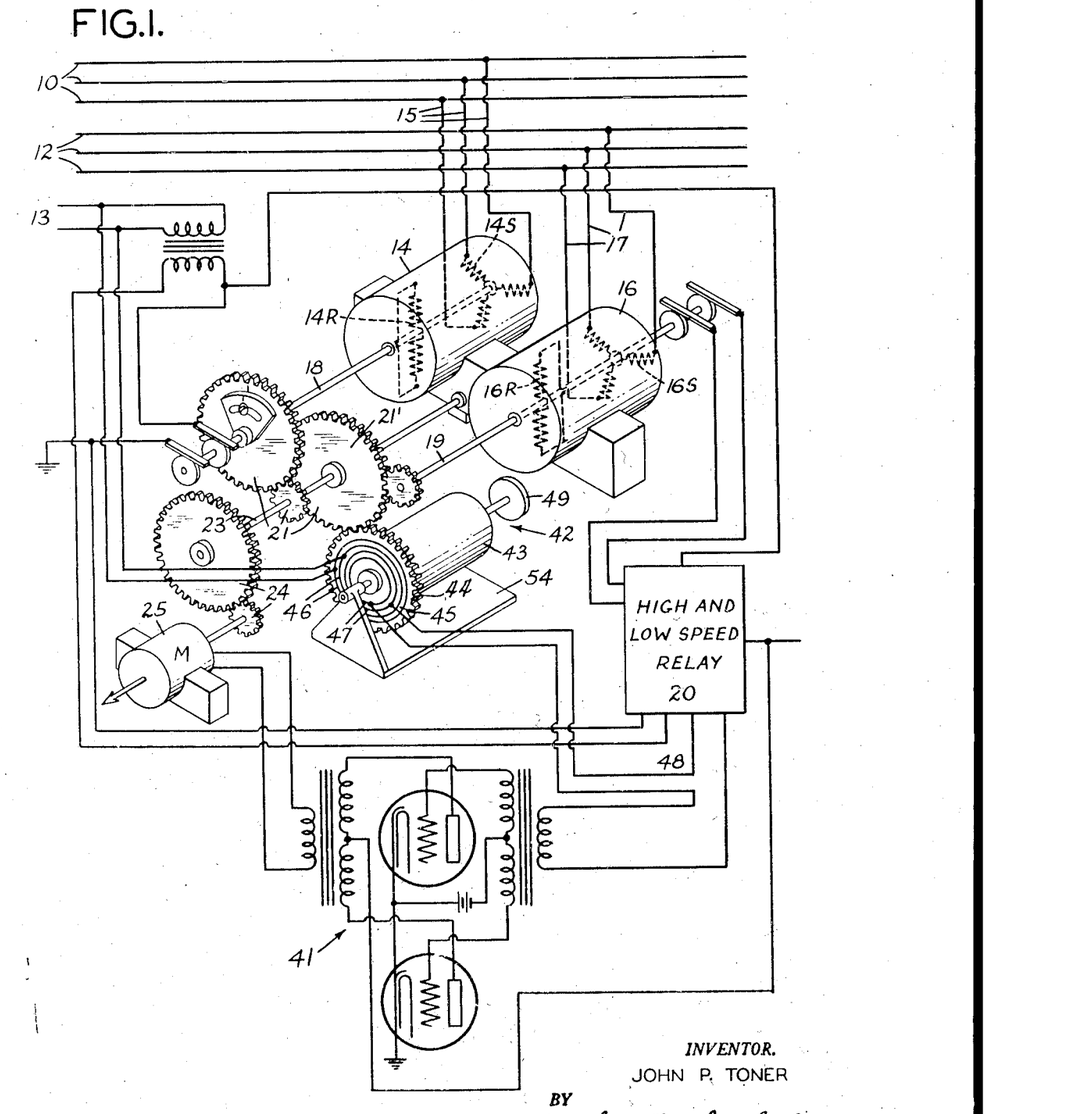
Figure 1 is a diagram of a modern electronic servo-control system, including a self-damping arrangement of the present invention.

Referring to Fig. 1, which illustrates a type of an electronic follow-up system to which the present invention is applicable, the self-synchronous signal or demand from the remote low and high speed transmitters, not shown, arrives along the two groups of bus wires 10 and 12, group 10 carrying the low speed signal and the group 12 carrying the high speed signal. The three space-phased currents are supplied from low speed bus wires 10 by the jumpers 15 to the stator windings 14S of the control transformer 14 and produce a rotating magnetic field, the orientation of which represents the demand value at any instant. Likewise, jumpers 17 supply high speed signal currents from high-speed bus wires 12 to stator windings 16S of the control transformer 16, to produce in it a rotating field travelling in synchronism with the rotating field 14S but much more rapidly, in order to give accuracy.

In the servo-control system under consideration, described in greater detail in said copending application, either one or the other of the control transformers 14 or 16 is in operation, depending upon synchronism between the remote transmitter and servo-motor 25, which is energized by error voltage induced in rotor winding 14R or 16R, whichever is connected thereto, and servo-motor 25 then drives that rotor winding to non-inductive relation to its stator, through gearing 24 and jack shaft 23 connected by gearing 21 to shafts 18 and 19 carrying respective rotor windings 14R and 16R. Shift from high to low speed control is automatically made by the relay 20 and the error voltage output of either control transformer 14 or 16 is amplified in electronic amplifier 41 to drive the servo-motor 25 as will be described, the structure of the relay being described in detail in said copending application.

The arrangement of the present invention in the above-described servo-control system includes the mechanism designated 42 in Fig. 1, whose principal element is a specially constructed generator mounted for bodily rotation about its armature axis. Such rotation of generator 43 is effected by servo-motor 25 connected thereto through gearing 24, jack shaft 23, large gear 21' of the group 21 and gear 44 fixed on the casing of generator 43, in order that the generator 43 may rotate at all times in synchronism with the servo-motor 25 and the rotor windings 14R and 16R of control transformers 14 and 16. Slip ring pairs 46 and 47 are provided mounted on an insulating disc 45 secured on the end of the casing of generator 43, as shown, the outer pair 46 receiving current from corresponding brushes connected to alternating current source 13, as shown, while brushes engaging the inner pair 47 feed the current generated in generator 43 in series opposition into the amplifier circuit of servo-motor 25, as shown at 48.

Figure 2:
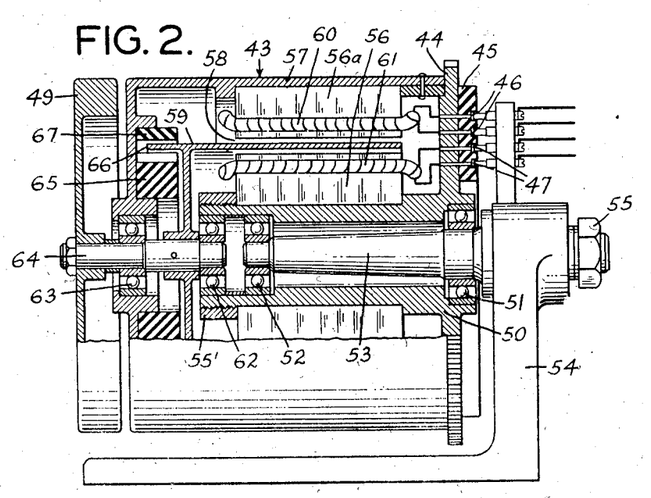
Figure 2 is an axial section taken through a preferred form of the damping generator which operates with the servo-control system of Fig. 1 according to this invention; and, Figs. 3 and 4 illustrate modifications of the generator assembly of this invention.

As shown in Fig. 2, the armature of generator 43 is free to rotate within its casing and is controlled by the flywheel 49 and its associated apparatus.

The casing of the generator 43 is provided with a re-entrant hub or column 50, which carries bearings 51 and 52, which are in turn carried on the journal 53 firmly secured in the bracket 54, as by the nut 55, it being understood that the bracket 54 is firmly mounted on the frame of the servo system of Fig. 1. As shown, the stator assembly 56, 56a is fixed to the hub 50, so that these two stators rotate together as the generator 43 is rotated bodily on bearings 51 and 52 by means of the integral gear 44 from the servo-motor 25, so that the stator system 56, 56a will, at all times, rotate in synchronism with servo-motor 25.

Each stator 56 and 56a has its own windings and between them is formed the air-gap 58 in which a thin, tubular armature shell 59 of conducting material is adapted to rotate, as shown in Fig. 2, to generate the damping currents. The outer stator 56a has its windings 60 supplied through the slip-rings 46 with single-phase alternating current from the leads 13 as shown in Fig. 1, and hence there is set up in stator 56a a pulsating field which itself has no direct effect on the stator windings 61 of the stator 56, because these windings are purposely placed so that they have little or no mutual inductance. However, when the tubular armature shell 59 is being driven, the currents inducted therein affect the other stator 56, producing in its winding 61 a voltage proportional to the speed of the armature shell 59 relatively to the stators 56 and 56a. The armature shell 59 is mounted on short shaft 64 carrying flywheel 49 and journalled on free bearings 62 and 63 supported respectively on the hub 50 and in the end of the casing 57. By this arrangement, the generating means of the damping generator 43 is purely inertia or acceleration controlled, i. e., when the servo-motor 25 is running uniformly, the flywheel 49 and shell armature 59 will be running with it and there will be no damping voltage generated because none is needed. However, as soon as the servo-motor 25 speeds up or slows down, there will be damping voltage generated in winding 61 because the flywheel 49, due to its inertia, will cause relative motion of the shell 59 to the stator assemblies 56 and 56a.

Although freedom of response of armature shell 59 is desired, complete freedom is not effective because of overrunning, so that viscous type coupling is provided to control it. Such a coupling may include an extension 66 on shell 59 lying in a gap between a multi-polar ring permanent magnet 65 and the continuous iron ring 67, both fastened in the casing 57, as shown. Finally, the generated damping voltage is taken from stator winding 61 through slip rings 47 and applied in series opposition, as shown in Fig. 1, to the driving circuit 48 of amplifier 41.

In operation of the servo-system of this invention, as disclosed in Figs. 1 and 2, the remote low and high speed self-synchronous transmitters, not shown, supply low speed signal and high speed signal to the bus wires 10 and 12, respectively. Being connected by wires 15 to low speed bus wires 10, a rotating low speed signal field is established in stator winding 14S of low speed control transformer 14, and a similar high speed rotating signal field is established in stator winding 16S of high speed transformer 16 by reason of its connection by wires 17 to high speed bus wires 12. The error voltage induced in one of the respective rotor windings 14R and 16R of transformers 14 and 16 in response to the corresponding stator fields when the rotor windings are in inductive angular relation to their stator windings, is impressed upon servo-motor 25, after amplification at 41. Servo-motor 25 responds to such error voltage to drive the active rotor winding through gearing 21 and 24 toward null or non-inductive angular relation with its corresponding stator winding, thus constantly striving to reduce the error voltage to zero.

Which rotor winding, 14R or 16R is active or effective to energize servo-motor 25 under the circumstances described, depends upon relay 20, which swings control from respective low speed to high speed control transformers 14 and 16, as often as necessary to maintain synchronism between servo-motor 25 and the remote transmitter. Thus, when low speed control transformer 14 is controlling servo-motor 25 and it is following closely, relay 20, in response to the low error voltage from transformer rotor winding 14R, quickly shifts control to the high speed transformer 16 for greater accuracy of following. Conversely, should synchronism be lost, such as when the apparatus is starting its operation, relay 20 shifts control to low speed transformer 14, whose rotor winding 14R feeds error voltage to servo-motor 25 which remains in operation only until servo-motor 25 is following the remote transmitter closely, when relay 20 shifts to high speed control in the manner described, high speed control transformer 16 thus being in control the major part of the time. The foregoing description of the operation of the servo-system illustrated in Fig. 1 and of relay 20 is given as a basis for explaining the operation of the improvements of the present invention, further details of the sytem and relay 20 being available by reference to said copending application.

The generator 43 of unit 42 interposed in the servo-motor circuit, is rotated bodily by servo-motor 25 through gearing 24, 21' and 44, thus rotating stators 56 and 56a, the alternating current-fed winding 60 (Fig. 2) of the former setting up a pulsating field in air gap 58. This tends to produce a voltage proportional to the speed of the servo-motor 25. Then, as armature shell 59 rotates in response to the magnetic drag of magnet 65 on the armature extension 66, the flux across air-gap 58 is altered by shell 59, so that the corresponding voltage induced in the winding 61 of the other stator 56 is reduced to a voltage proportional to the speed of shell 59 relatively to the stators 56 and 56a. Thus, voltage generated in stator winding 61 is picked up from inner slip-rings 47 and fed at 48 in opposition to the error voltage in the circuit of servo-motor 25, to thereby accurately damp the same as soon as a speed variation occurs, thus eliminating a double set of generators as in the aforementioned prior system.

The operation of the system of this invention may be set forth mathematically as follows: If $\theta_1$=displacement of generator stator 56, 56a and $r_1$ its speed, $\theta_2$=displacement of generator armature shell 59 and $r_2$ its speed, then $$r_1 = \dot{\theta}_1 = \frac{d\theta_1}{dt} \text{ and}$$

$$r_2 = \dot{\theta}_2 = \frac{d\theta_2}{dt}$$

If $r$=speed of armature shell 59 relatively to stator 56, 56a, then $r=r_1-r_2$, and if $E_d$=output damping voltage of generator 43, then $E_d=Cr$, where C is a constant of proportionality.

In the form shown in Fig. 2, the armature shell 59 is coupled to the stator assembly 56, 56a only by the magnetic drag due to magnet 65, so that if
$T_1$=Torque due to magnetic drag, then
$T_1=B_1r$, where $B_1$ is a constant of proportionality.

If $I_1$ represents the inertia of the flywheel 49 and $I_2$ all other inertia in the armature shell 59, let $$I = I_1 + I_2$$

Likewise if $B_1$=drag due to magnet 65 and $B_2$=all other viscous drag and B=total drag (neglecting all Coulomb friction), let $$B = B_1 + B_2$$

With this idealized arrangement, the torque T acting on I is $$T = Br = B(r_1 - r_2)$$

and the equation of the motion is $$I\dot{r}_2 = B(r_1 - r_2)$$

Now, if it is assumed that $\theta_m$, the displacement of the servo-motor is sinusoidal, then $r_m$, the speed of the servo-motor 25, is also sinusoidal and, if only steady-state response is considered, and if $$S = \frac{d}{dt}$$

then $$ISr_2 = Br_1 - Br_2$$

$$r_2 = \frac{B}{IS+B} \cdot r_1$$

$$r = r_1 - r_2$$

$$= r_1\left(1 - \frac{B}{IS+B}\right) = \frac{IS}{IS+B} \cdot r_1$$

but $r_1 = gr_m$, where $g$ is the gear ratio between the servo-motor 25 and the generator assembly 42, and, since $r$ is sinusoidal, $S=j\omega$, $$r = \frac{j\omega I}{j\omega I + B} \cdot r_m$$

and the damping voltage, $$E_d = C \cdot g \cdot \frac{j\omega I}{j\omega I + B} \cdot r_m$$

(1) $$E_d = C \cdot g \cdot \frac{j\omega I}{j\omega I + B} \cdot \frac{d\theta_m}{dt} = C \cdot g \cdot \frac{I}{IS+B} \cdot \frac{d^2\theta_m}{dt^2}$$

Figure 3:
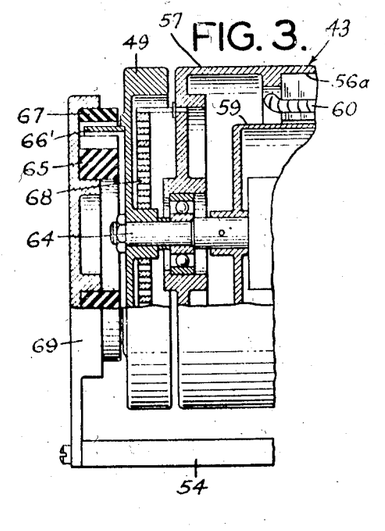

Instead of effecting the magnetic drag from rotor to stator, as in Fig. 2, it may be effected from the rotor to the fixed structure of the mechanism. Such modification is illustrated in Fig. 3, wherein all common parts are numbered the same as in Fig. 2, the change being made at the left-hand end. Thus, instead of supporting the magnet 65 and cooperating iron ring 67 on the stator casing 57, they are supported on a bracket 69 secured to the frame 54, with the extension 66' cooperating with magnet 65 and ring 67 being carried by the flywheel 49 instead of being mounted directly on the armature. Also, a spiral clock-spring 68 is connected between the inertia flywheel 49 and the stator casing 57, as shown. Now, the spiral clock-spring 68 causes the armature shell 59 to turn and thus reduce the voltage induced in the stator 56 by stator 56a, and this voltage is fed into the circuit of servo-motor 25 as described. Mathematically expressed, and if total drag (B), flywheel and armature inertia (I) and the spring 68 constant (K) are the combined parameters, and Coulomb friction is again neglected, then the torque acting on the armature shell 59 is $$T = \frac{1}{K}(\theta_1 - \theta_2)$$

and the equation of motion is $$I\ddot{\theta}_2 + B\dot{\theta}_2 = \frac{1}{K}(\theta_1 - \theta_2)$$

or $$IS^2\theta_2 + BS\theta_2 + \frac{1}{K}\theta_2 = \frac{1}{K}\theta_1$$

but $$S\theta_2 = r_2, S\theta_1 = r_1$$

therefore $$\theta_2 = \frac{r_2}{S}, \theta_1 = \frac{r_1}{S}$$

substituting in above $$ISr_2 + Br_2 + \frac{1}{K} \cdot \frac{r_2}{S} = \frac{1}{K} \cdot \frac{r_1}{S}$$

$$r_2 = \frac{\frac{1}{KS}}{IS + B + \frac{1}{KS}} \cdot r_1$$

but, since $$r = r_1 - r_2$$

$$r = \frac{IS + B}{IS + B + \frac{1}{KS}} \cdot r_1$$

and (2) $$E_d = C \cdot g \cdot \frac{IS + B}{IS + B + \frac{1}{KS}} \cdot \frac{d\theta_m}{dt} =$$

$$C \cdot g \cdot \frac{IS + B}{IS^2 + BS + \frac{1}{K}} \cdot \frac{d^2\theta_m}{dt^2} =$$

$$\frac{C \cdot g}{IS^2 + BS + \frac{1}{K}} \cdot \left(I\frac{d^3\theta_m}{dt^3} + B\frac{d^2\theta_m}{dt^2}\right)$$

which is the damping voltage from the generator 43 of the modification of the invention shown in Fig. 3. In this case B must be large enough so that the coupling circuit containing the spring 68 is itself critically damped.

Figure 4:
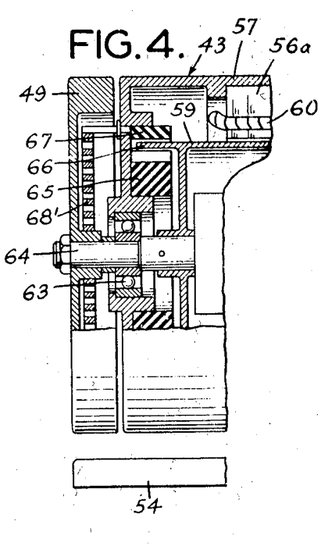

Referring to Fig. 4, like parts are again numbered as in Figs. 2 and 3 and the assembly is quite similar to that shown in Fig. 2 except that clock-spring 68' has been introduced between casing 57 and flywheel 49, as shown, in addition to the magnetic drag device 65, 66, 67. The operation of the modification of Fig. 4 is in general similar to that of Fig. 3 and involves the following relations:

$$T = \frac{1}{KS}(r_1 - r_2) + B(r_1 - r_2)$$

$$I_s r_2 = \frac{1}{KS}(r_1 - r_2) + B(r_1 - r_2)$$

$$\left(I_s + B + \frac{1}{KS}\right)r_2 = \left(\frac{1}{KS} + B\right)r_1$$

$$r_2 = \frac{\frac{1}{KS} + B}{IS + B + \frac{1}{KS}} r_1$$

$$r = \frac{IS}{IS + B + \frac{1}{KS}} r_1$$

and
(3)

$$E_d = C \cdot g \cdot \frac{IS}{IS + B + \frac{1}{KS}} \cdot \frac{d\theta}{dt} = C \cdot g \cdot \frac{I}{IS^2 + BS + \frac{1}{K}} \cdot \frac{d^2\theta_m}{dt^2}$$

In all of the modifications of the invention shown in Figs. 2 to 4, it will be observed that the stator assembly of generator 43 of unit 42 rotates with the servo-motor 25, being geared thereto, and that the damping voltage generated by the same is due to changing speed of the servo-motor 25 acting on the inertia masses used. Consequently, there is no lag produced in servo-motor response to the signal when following a uniform signal, but the damping effect appears promptly when acceleration appears in the servo-motor 25. As will be seen, there are no brushes on the armature shell 59 so that it responds in a manner accurately determined by the motion of the system and the mechanical filter, thereby providing the necessary damping control to the servo-system shown in Fig. 1.

It will also be observed that the damping voltage output of unit 42 will be an increasing function of frequency, and that this function can be adjusted to be most suitable for any particular servo-motor by selection of the appropriate circuit and choice of the individual parameters. Furthermore, the damping arrangement of this invention, when used with alternating current voltage, is not sensitive to large variations in the frequency of the supply voltage, which is not true for damping systems which work on the error voltage. Also, the system of this invention is superior to damping systems which work on the error voltage in applications where the coupling between the servo-motor 25 and positioning device, such as the control transformer 14 or 16, is loose, since the damping device 43 can be rigidly coupled to the servo-motor.

The system of this invention is superior to one using two generators, in features other than compactness and simplicity. In order to obtain high accuracy for constant velocity signals in a system using two generators, the two separate generators must be accurately matched over the required speed range. Also, this matching may have to be maintained for wide variations in (a) Ambient temperature,
(b) Magnitude of the applied voltage,
(c) Frequency of the applied voltage.

Although several embodiments of this invention have been illustrated and described herein, it is to be understood that the invention is not limited thereby but is susceptible of changes in form and detail within the scope of the appended claims.

I claim:

1. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator having rotable rotor and stator members, driving connections between said servo-motor and said stator member, means responsive to changes in speed of said stator member for driving said rotor member, and means mounted on said rotor member and cooperating with said stator member for supplying to said servo-motor a voltage that is a function of changes in the speed of said stator member, whereby the response of said servo-motor to the voltage induced in said transformer rotor winding is modified by the voltage generated in said damping generator.

2. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator having rotatable rotor and stator members, driving connections between said servo-motor and said stator member, means responsive to changes in speed and in acceleration of said stator member for driving said rotor member, and means mounted on said rotor member cooperating with said stator member for supplying to said servo-motor a voltage that is a function of changes in the speed and in the acceleration of said stator member, whereby the response of said servo-motor to the voltage induced in said transformer rotor winding is modified by the voltage generated in said damping generator.

3. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator having rotatable rotor and stator members, driving connections between said servo-motor and said stator member, means responsive to changes in acceleration of said stator member for driving said rotor member, and means mounted on said rotor member and cooperating with said stator member for supplying to said servo-motor a voltage that is a function of changes in the acceleration of said stator member, whereby the response of said servo-motor to the voltage induced in said transformer rotor winding is modified by the voltage generated in said damping generator.

4. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, means responsive to changes in speed of said stator for driving said armature, and series opposition connections between said generating winding and the input circuit of said servo-motor, whereby the error voltage induced in said transformer rotor winding is opposed by any voltage generated in said damping generator.

5. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, coupling means interposed between said armature and stator and responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

6. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, means responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

7. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, viscous coupling means loosely connecting said armature to said stator and responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

8. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, magnetic coupling means on said stator creating a magnetic drag on said armature in response to changes in speed of said stator for driving said armature, and electrical connections between said generating winding and the circuit of said servo-motor, whereby the response of said servo-motor to the voltage induced in said transformer rotor winding is modified by the voltage generated in said damping generator.

9. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, elastic means interposed between said armature and said stator and responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

10. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding modifying the flux to which said generating winding responds, means responsive to changes in speed of said stator for driving said armature, means retarding motion of said armature, and electrical connections between said generating winding and the circuit of said servo-motor, whereby the response of said servo-motor to the voltage induced in said transformer rotor winding is modified by the voltage generated in said damping generator.

11. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, means responsive to changes in speed of said stator for driving said armature, inertia means on said armature, and electrical connections between said generating winding and the circuit of said servo-motor, whereby the response of said servo-motor to the voltage induced in said transformer rotor winding is modified by the voltage generated in said damping generator.

12. In an electromechanical servo-control system having a servo-motor energized by the voltage generated in a transformer rotor winding driven by the servo-motor toward non-inductive angular relation in the field of the transformer stator winding energized in accorance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, means responsive to changes in speed of said stator for driving said armature, a flywheel for said armature, and electrical connections between said generating winding and the circuit of said servo-motor, whereby the response of said servo-motor to the voltage induced in said transformer rotor winding is modified by the voltage generated in said damping generator.

13. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, a flywheel for said armature, means interposed between said flywheel and said stator and responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

14. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, a flywheel for said armature, elastic means interposed between said flywheel and said stator and responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

15. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, a flywheel for said armature, magnetic drag means interposed between said flywheel and said stator and responsive to changes in speed of said stator for driving said armature, and electrical connections between said generating winding and the circuit of said servo-motor, whereby the response of said servo-motor to the voltage induced in said transformer rotor winding is modified by the voltage generated in said damping generator.

16. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, a flywheel for said armature, means responsive to changes in speed of said stator for driving said armature, an elastic coupling between said flywheel and said stator, and electrical connections between said generating winding and the circuit of said servo-motor, whereby the response of said servo-motor to the voltage induced in said transformer rotor winding is modified by the voltage generated in said damping generator.

17. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, a flywheel for said armature, elastic means interposed between said flywheel and said stator and responsive to changes in speed of said stator for driving said armature, magnetic drag means for said flywheel, and electrical connections between said generating winding and the circuit of said servo-motor, whereby the response of said servo-motor to the voltage induced in said transformer rotor winding is modified by the voltage generated in said damping generator.

18. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, coupling means connecting said armature to said stator and responsive to changes in speed of said stator for driving said armature, a flywheel for said armature, magnetic drag means for said flywheel, and electrical connections between said generating winding and the circuit of said servo-motor, whereby the response of said servo-motor to the voltage induced in said transformer rotor winding is modified by the voltage generated in said damping generator.

19. In an electromechanical servo-control system having a servo-motor energized by the voltage generated in a transformer rotor winding driven by the servo-motor toward non-inductive angular relation in the field of the transformer stator winding energized in accordance with the movements of a remote self-synchronous transmitting means, the combination of a damping generator, a rotatable stator therefor including a field winding and a generating winding in the field thereof, an alternating current source connected to said field winding, driving connections between said servo-motor and said stator, an armature rotatable in the field of said field winding for modifying the flux to which said generating winding responds, a flywheel for said armature, elastic means interposed between said flywheel and said stator and responsive to changes in speed of said stator for driving said armature, magnetic drag means interposed between a fixed part of said generator and said flywheel for retarding rotation of said flywheel, and electrical connections between said generating winding and the circuit of said servo-motor, whereby the response of said servo-motor to the voltage induced in said transformer rotor winding is modified by the voltage generated in said damping generator.

20. In an electromechanical servo-control system adapted to be actuated in accordance with the movements of remote self-synchronous transmitting means, the combination of a transformer having a stator winding energized by said transmitting means and a rotor winding inductively coupled to said stator winding, a servo-motor electrically connected to said rotor winding for energization in accordance with the voltage induced therein, driving connections between said servo-motor and said rotor whereby the latter is driven by said servo-motor to non-inductive relation with said stator, a generator having a rotatable stator including a field winding and a generating winding, connections between said field winding and an alternating current source, driving connections between said servo-motor and said generator stator, an armature interposed between the field and generating windings of said stator, means responsive to changes in speed of said stator for driving said armature, and electrical connections between said generating winding and the circuit of said servo-motor.

21. In an electromechanical servo-control system adapted to be actuated in accordance with the movements of remote self-synchronous transmitting means, the combination of a transformer having a stator winding energized by said transmitting means and a rotor winding inductively coupled to said stator winding, a servo-motor electrically connected to said rotor winding for energization in accordance with the voltage induced therein, driving connections between said servo-motor and said rotor whereby the latter is driven by said servo-motor to non-inductive relation with said stator, a generator having a rotatable stator including a field winding and a generating winding, connections between said field winding and an alternating current source, driving connections between said servo-motor and said generator stator, an armature interposed between the field and generating windings of said stator, means responsive to changes in speed and in acceleration of said stator for driving said armature, and electrical connections between said generating winding and the circuit of said servo-motor.

22. In an electromechanical servo-control system adapted to be actuated in accordance with the movements of remote self-synchronous transmitting means, the combination of a transformer having a stator winding energized by said transmitting means and a rotor winding inductively coupled to said stator winding, a servo-motor electrically connected to said rotor winding for energization in accordance with the voltage induced therein, driving connections between said servo-motor and said rotor whereby the latter is driven by said servo-motor to non-inductive relation with said stator, a generator having a rotatable stator including a field winding and a generating winding, connections between said field winding and an alternating current source, driving connections between said servo-motor and said generator stator, an armature interposed between the field and generating windings of said stator, means responsive to changes in acceleration of said stator for driving said armature, and electrical connections between said generating winding and the circuit of said servo-motor.

23. In an electromechanical servo-control system adapted to be actuated in accordance with the movements of remote self-synchronous transmitting means, the combination of a transformer having a stator winding energized by said transmitting means and a rotor winding inductively coupled to said stator winding, a servo-motor electrically connected to said rotor winding for energization in accordance with the voltage induced therein, driving connections between said servo-motor and said rotor whereby the latter is driven by said servo-motor to non-inductive relation with said stator, a damping generator having a stator winding driven by said servo-motor and including a generating winding, an armature for said generator, an elastic coupling interposed between said armature and said stator whereby the latter drives the former in response to changes in speed of the stator, and opposed electrical connections between the output of said generating winding and the input of said servo-motor.

24. In an electromechanical servo-control system adapted to be actuated in accordance with the movements of remote self-synchronous transmitting means, the combination of a transformer having a stator winding energized by said transmitting means and a rotor winding inductively coupled to said stator winding, a servo-motor electrically connected to said rotor winding for energization in accordance with the voltage induced therein, driving connections between said servo-motor and said rotor whereby the latter is driven by said servo-motor to non-inductive relation with said stator, a generator having a rotatable stator including a field winding and generating winding, connections between said field winding and an alternating current source, driving connections between said servo-motor and said generator stator, an armature interposed between the field and generating windings of said stator, viscous coupling means responsive to changes in speed of said stator for driving said armature, and series opposition electrical connections between said generating winding and the circuit of said servo-motor.

JOHN P. TONER.

No references cited.

Certificate of Correction

Patent No. 2,457,330.   December 28, 1948.

JOHN P. TONER

It is hereby certified that error appears in the printed specification of the above numbered patent requiring correction as follows:

Column 7, line 22, Equation 3, for that portion of the factor where the sub-notation following "$d\theta$" is illegible, read $d\theta_m$;

and that the said Letters Patent should be read with this correction therein that the same may conform to the record of the case in the Patent Office.

Signed and sealed this 24th day of May, A. D. 1949.

[SEAL]

THOMAS F. MURPHY,
*Assistant Commissioner of Patents.*